United States Patent [19]

Terai et al.

[11] Patent Number: 4,987,732
[45] Date of Patent: Jan. 29, 1991

[54] MOWING APPARATUS HAVING OPPOSITELY RECIPROCATING CUTTERS

[75] Inventors: Akio Terai, Machida; Junichi Yoshino, Tokyo; Shinroku Satsumi, Tokyo; Mitsuru Taniguchi, Tokyo, all of Japan

[73] Assignee: Komatsu Zenoah Co., Tokyo, Japan

[21] Appl. No.: 297,717

[22] Filed: Jan. 17, 1989

Related U.S. Application Data

[63] Continuation-in-part of Ser. No. 86,496, Aug. 17, 1988, Pat. No. 4,881,363.

[30] Foreign Application Priority Data

| Aug. 26, 1986 | [JP] | Japan | 61-198226 |
| Jul. 6, 1987 | [JP] | Japan | 62-102664 |
| Jul. 6, 1987 | [JP] | Japan | 62-102665 |

[51] Int. Cl.⁵ .................. A01D 34/76; A01D 34/68
[52] U.S. Cl. ........................ 56/255; 56/295; 30/265; 30/276
[58] Field of Search .......... 56/255, 11.2, 11.3, 56/242, 258, 295, 296, 241, 256; 30/263, 264, 265, 207, 240, 276, 347, DIG. 5

[56] References Cited

U.S. PATENT DOCUMENTS

| 2,119,683 | 6/1938 | Nevraumont | 30/207 |
| 2,976,665 | 3/1961 | Speckman | 56/255 |
| 3,472,007 | 10/1969 | Greene | 56/11.3 |
| 3,618,304 | 11/1971 | Hundhausen | 56/295 |
| 3,631,658 | 1/1972 | Greene | 56/11.3 |
| 4,451,983 | 6/1984 | Johnson et al. | 30/276 |
| 4,848,846 | 7/1989 | Yamada et al. | 30/276 |

FOREIGN PATENT DOCUMENTS

| 0028443 | 4/1970 | Australia . |
| 0043587 | 1/1974 | Australia . |
| 522302 | 3/1978 | Australia . |
| 0068701 | 3/1980 | Australia . |

Primary Examiner—Ramon S. Britts
Assistant Examiner—Terry Lee Melius
Attorney, Agent, or Firm—Helfgott & Karas

[57] ABSTRACT

To mow even soft grass more tidily in shearing mode without kicking pebbles, a pair of two grass cutting wheels are pivotally driven by an engine in two mutually-different directions. One cutting wheel is slidably fixed relative to the other cutting wheel for safety. The mowing machine can be used in common to shear off grass on the ground and trim a garden tree by adjusting an angle between a hollow grip pipe and the machine cutting surface.

20 Claims, 11 Drawing Sheets

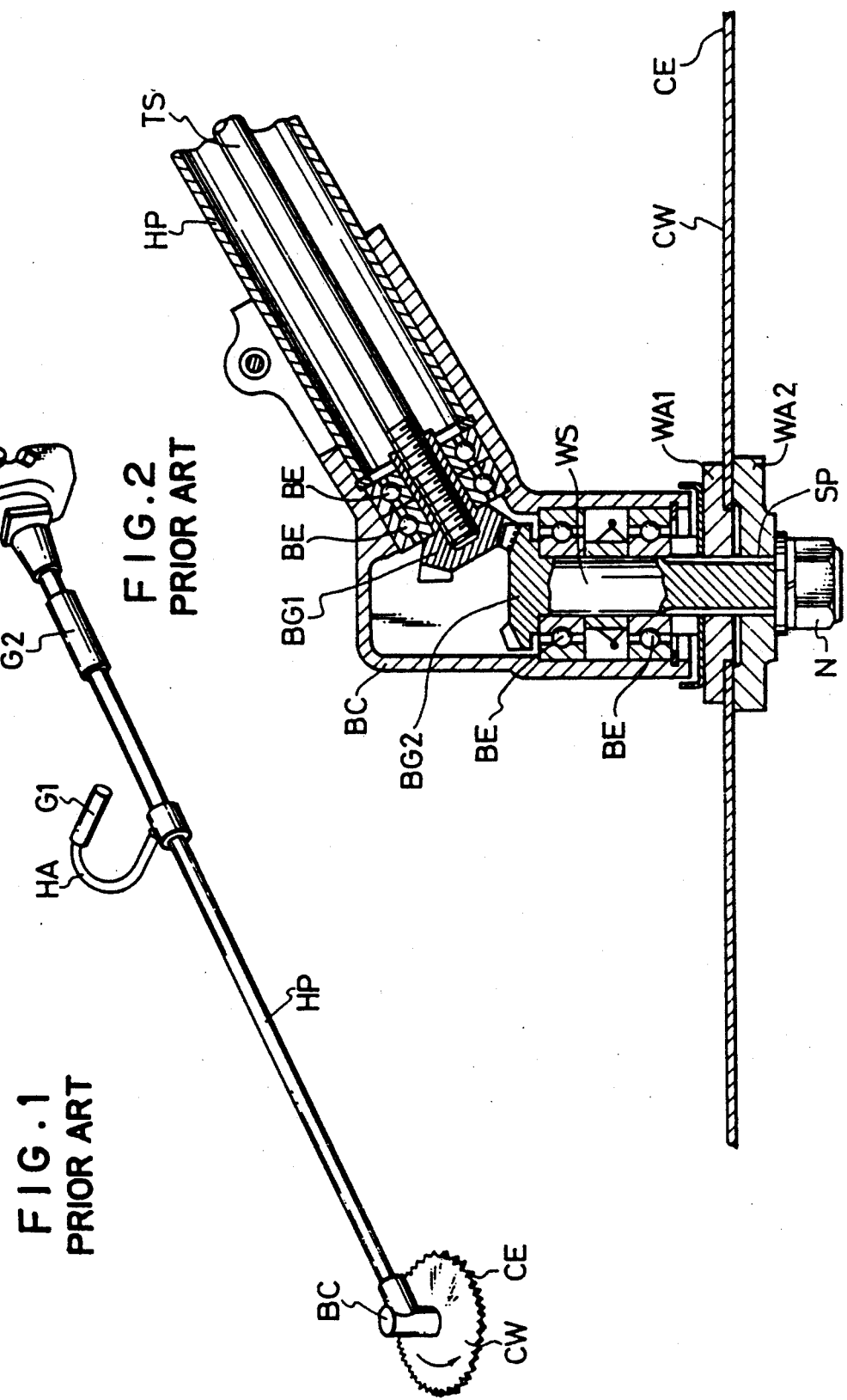

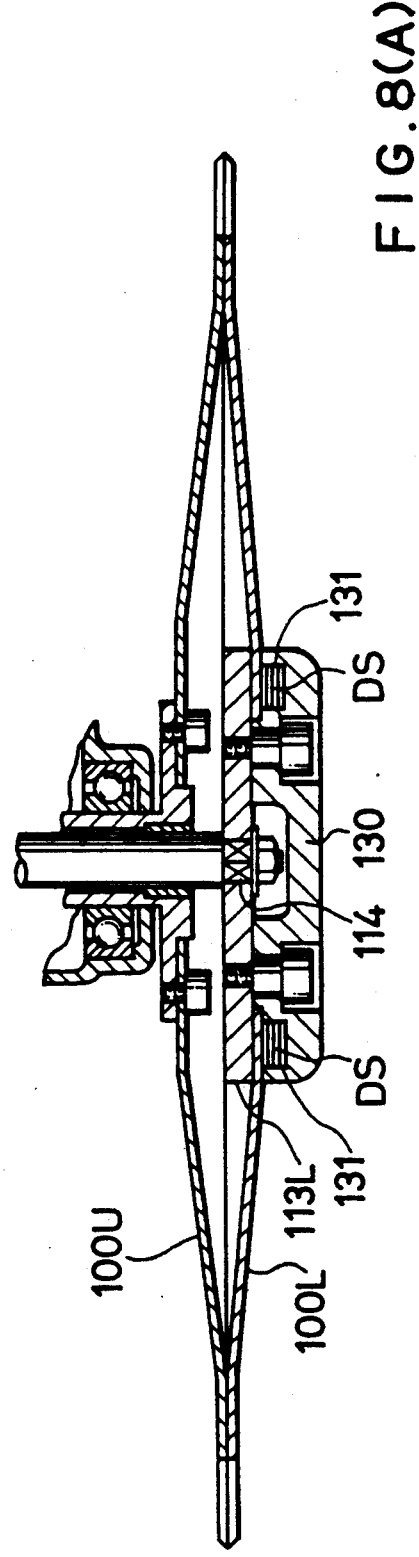
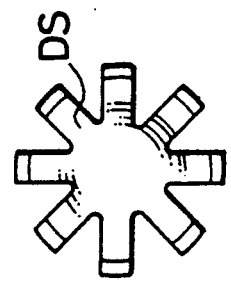
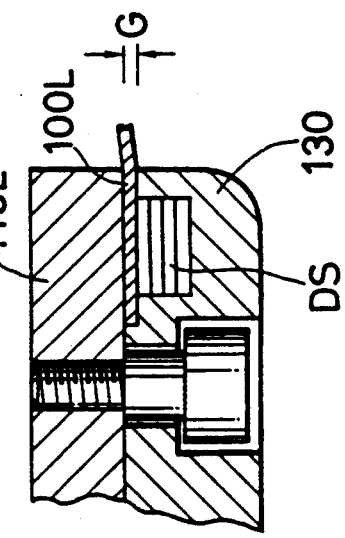

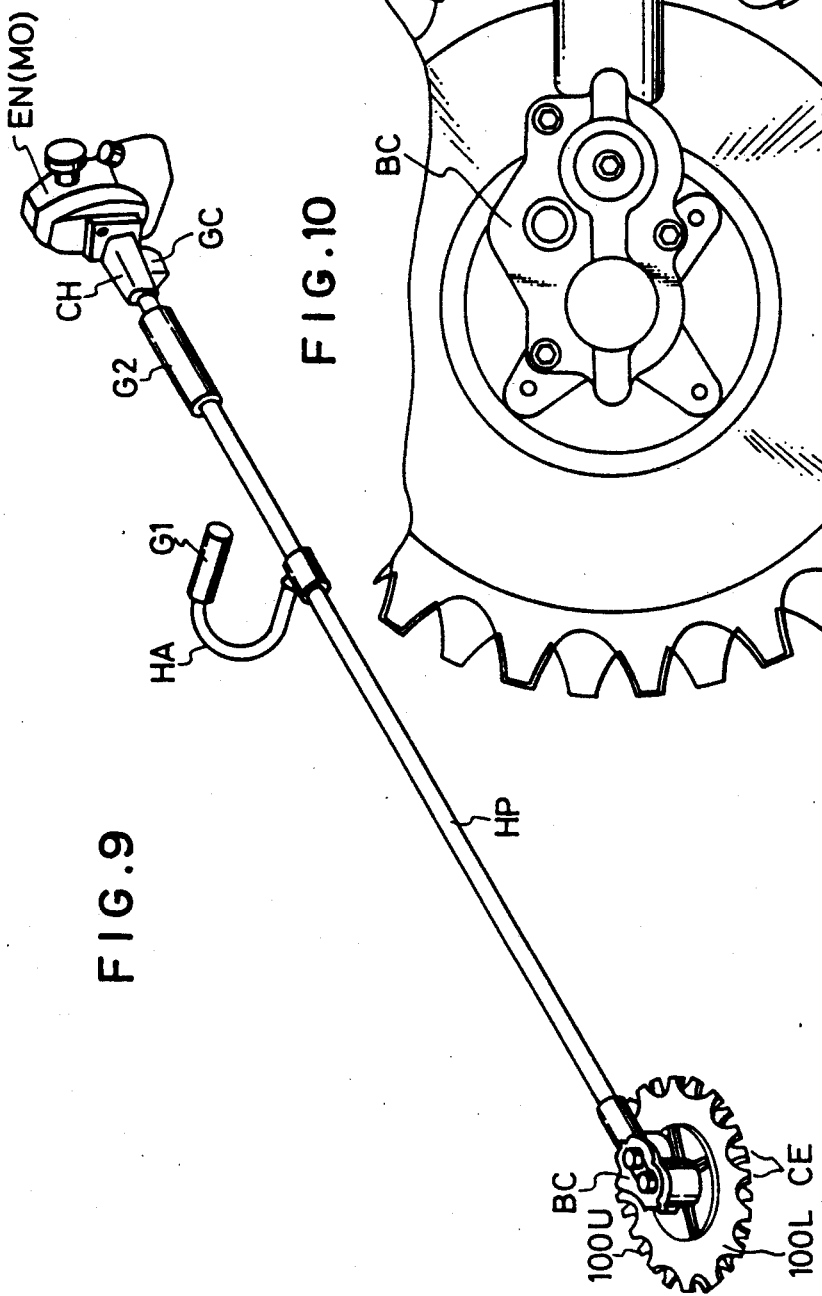
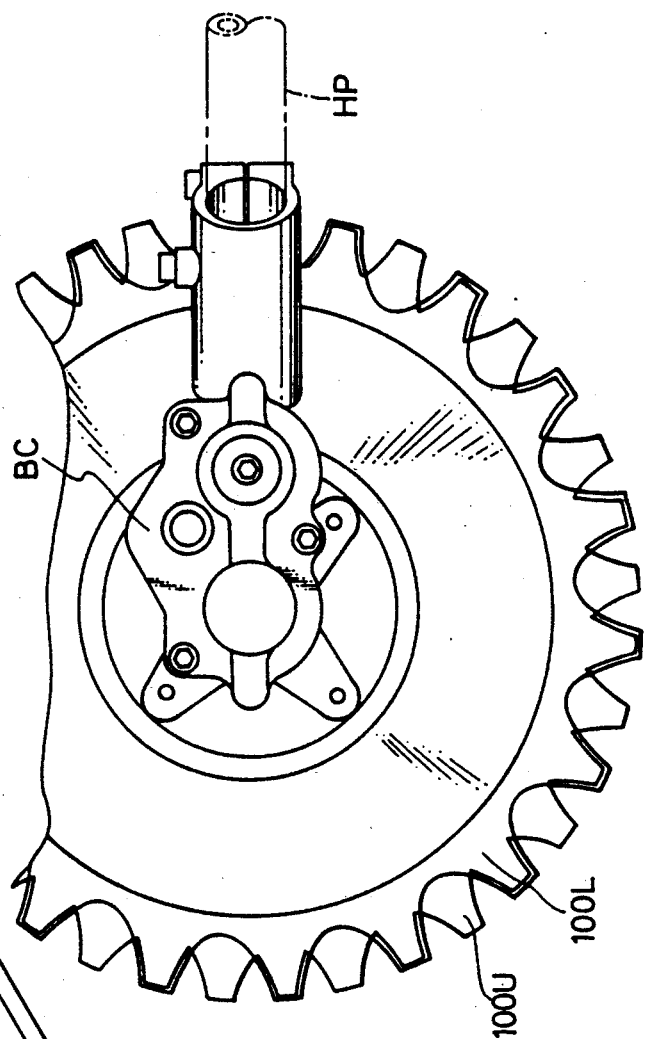
FIG.9
FIG.10

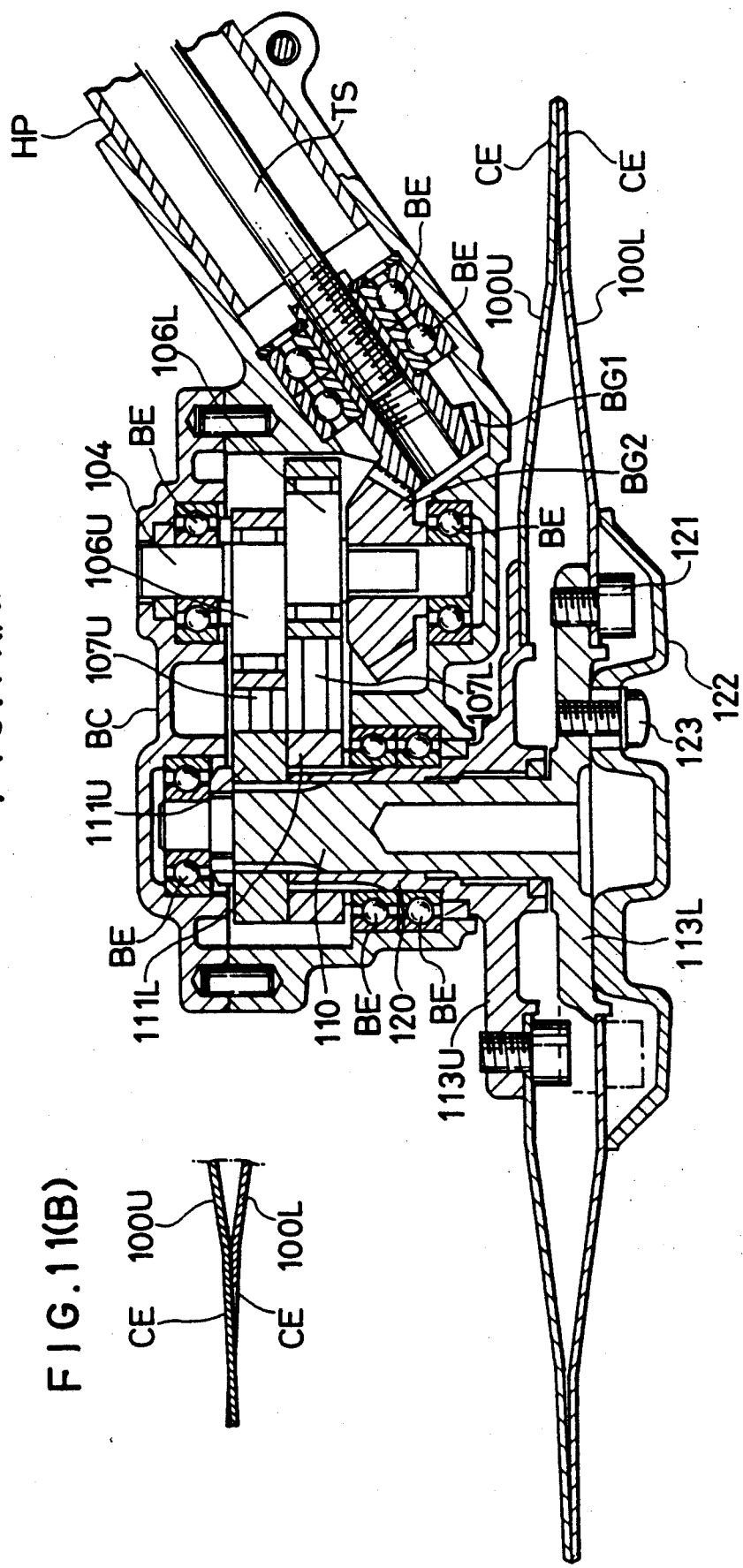
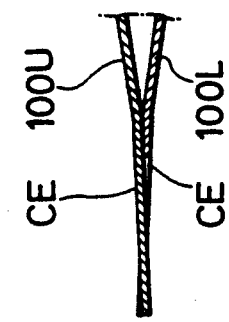
FIG.11(A)
FIG.11(B)

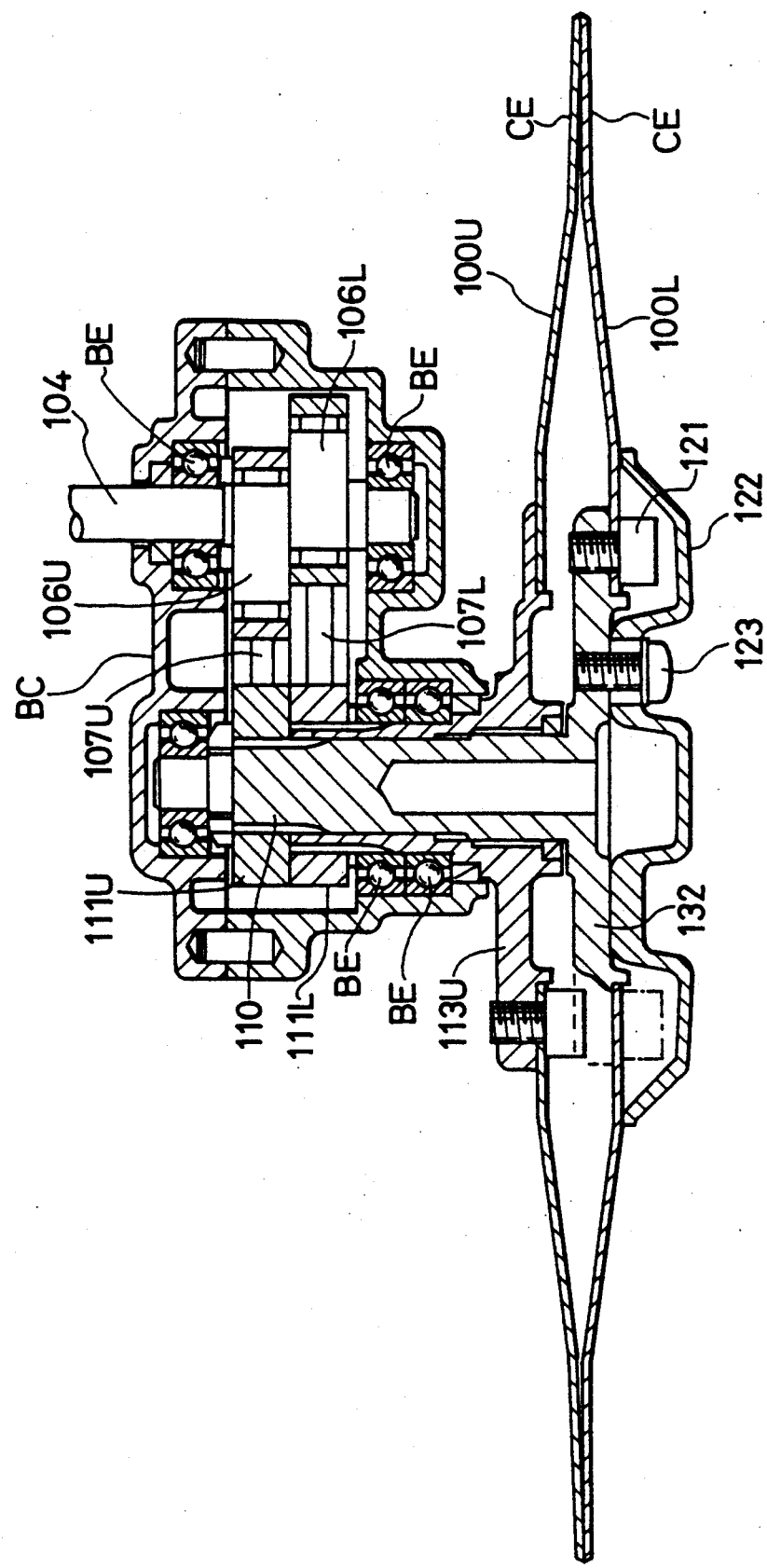

B-B

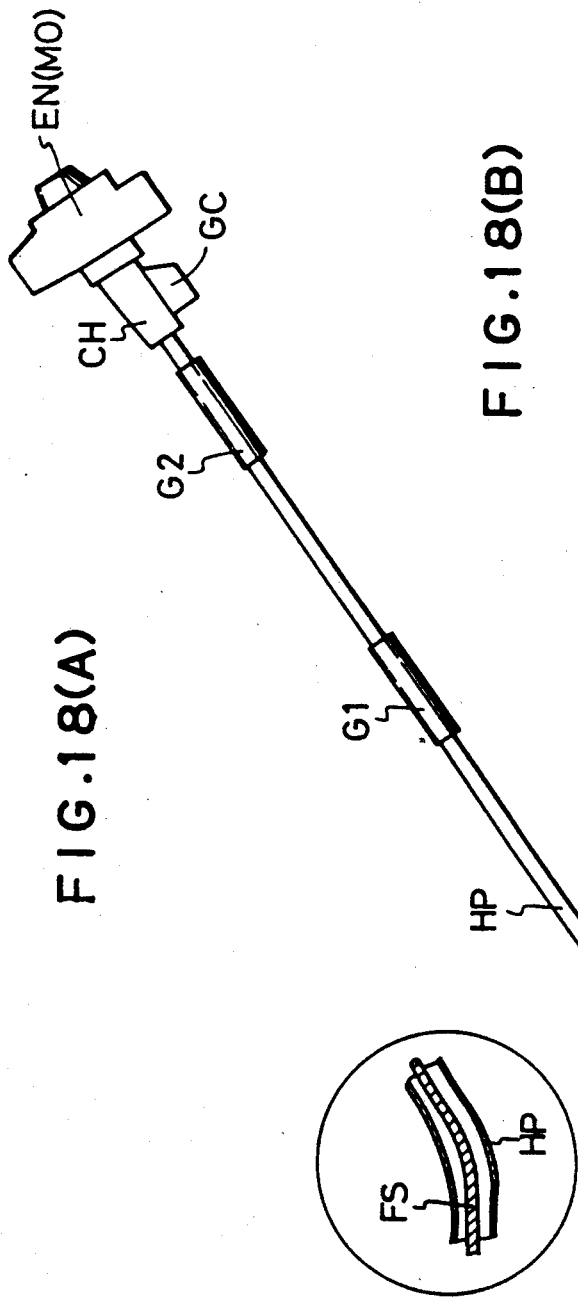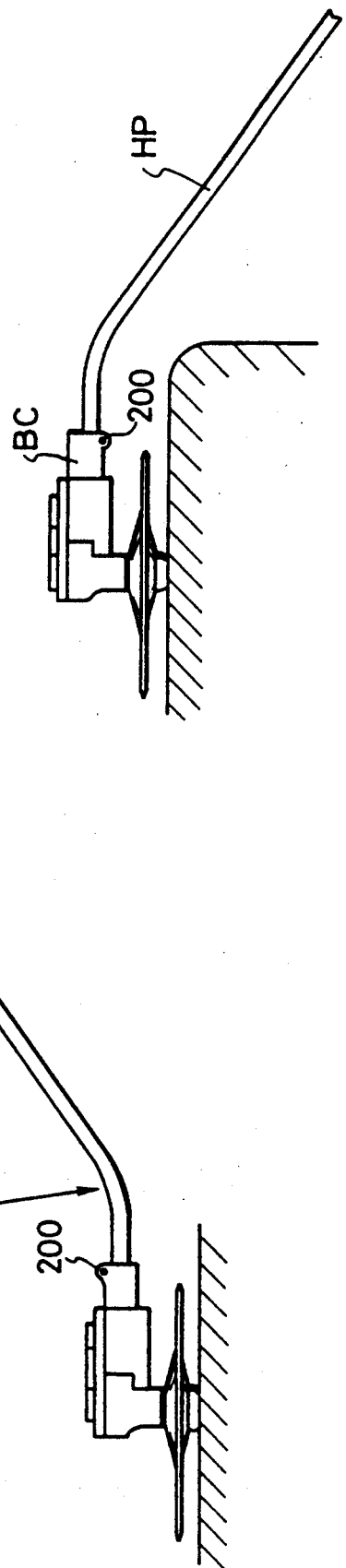
FIG.18(A)
FIG.18(B)

MOWING APPARATUS HAVING OPPOSITELY RECIPROCATING CUTTERS

BACKGROUND OF THE INVENTION

This application is a continuation in part application from U.S. Patent Application Ser. No. 086,496 filed on Aug. 17, 1988, now U.S. Pat. No. 4,881,363.

FIELD OF THE INVENTION

The present invention relates to a mowing apparatus driven by an engine or the like to mow grass or sprig or the like. This invention can be embodied in a portable type mower or trimmer, a shoulder type mower or trimmer, or vehicular type mower or trimmer (including a mower or a trimmer mounted on a truck or the like). Further, this invention can also be embodied in a vehicle type or a push type lawn mower, a hedge trimmer, an edger, or soy or barley reaper. Furthermore, the apparatus of this invention can also be used as an attachment for a construction machine or an industrial machine.

DESCRIPTION OF THE PRIOR ART

In prior-art mowing machines for mowing grass or sprig, for example a single rotatable cutter wheel which is supported by a cutter support body and is driven by an engine or a motor via a drive shaft passed through a hollow pipe connected between the engine and the cutter support body was used. Therefore, when the worker grips two grip portions by both hands and swings the hollow pipe to and fro, it is possible to mow grass by the single rotating cutter wheel.

In the prior-art mowing machine, however, since only the single cutter wheel rotates at a relatively high speed, there exist various problems such that pebblestones may be dangerously kicked off; the machine itself must be swung violently to mow grass; and soft grass usually remains unmowed.

A more detailed description of the prior-art mowing machine will be made with reference to the attached drawings under DETAILED DESCRIPTION OF THE PREFERRED EMBODIMENTS.

SUMMARY OF THE INVENTION

With these problems in mind, therefore, it is the primary object of the present invention to provide a novel mowing apparatus which can improve the mowing performance, that is, mow even soft grass more tidily without kicking pebblestones.

In order to achieve the above-mentioned object, a mowing apparatus driven by rotational motion supplied from a motive power source according to the present invention, which comprises:

a pair of first and second pivotal cutting wheels slidably superposed with each other and each provided with a number of grass cutting edges; and means for reciprocatingly rotating each cutting wheel in opposite directions through a predetermined angle, respectively, wherein, said rotating means comprises:

(a) a crank shaft rotatably driven by said motive power source;

(b) a first shaft coupled to said first wheel;

(c) a second shaft having a cylindrical shape into which said first shaft is rotatably and coaxially inserted and coupled to said second wheel; and (d) crank lever meachanism provided between said crank shaft and said first and second shafts for converting the rotational motion in said crank shaft into two oppositely and reciprocatingly rotational motions in said first and second shaft to reciprocatingly rotate the first and second wheels relative to each other about an axis of said shafts through the predetermined angle.

The motive power source is an engine, an electrical motor or a hydraulic pressure motor.

The crank lever mechanism comprises first and second circular cam plates each fixed to said crank shaft in radially symmetrical positional relationship with respect to a center of said crank shaft; first and second connecting rods each pivotably coupled to each of said first and second circular cams, respectively; and first and second arm each pivotally coupled to at one ends thereof an end of said first connecting rod and an end of said second connecting rod, respectively, and said first and second arm being coupled to at the other ends thereof each of said first and second shafts, respectively.

Further, first and second crank arms each fixed to said crank shaft in radially symmetrical positional relationship with respect to a center of said crank shaft can be used in the crank lever mechanism.

BRIEF DESCRIPTION OF THE DRAWINGS

The features and advantages of the mowing apparatus according to the present invention over the prior-art machine will be more clearly appreciated from the following description of the preferred embodiments of the invention taken in conjunction with the accompanying drawings in which like reference numerals designate the same or similar elements or sections throughout the figures thereof and in which:

FIG. 1 is a perspective view showing an example of prior-art mowing machine;

FIG. 2 is an enlarged cross-sectional view showing a rotary cutter wheel and a cutter wheel support body of the prior-art mowing machine;

FIG. 6 is a similar cross-sectional view of the pivotal cutting wheels drive mechanism of a second embodiment of the mowing apparatus according to the present invention;

FIG. 7 is a fragmentary enlarged view for assistance in explaining a lower pivotal cutting wheel;

FIG. 8(A) is a cross-sectional view showing a dish-shaped plate spring for providing a frictional force between the two upper and lower pivotal cutting wheels;

FIG. 8(B) is a top view showing the dish-shaped plate spring;

FIG. 9 is a perspective view of a third embodiment of the mowing apparatus according to the present invention;

FIG. 10 is a top plan view of the main part of the mowing apparatus in FIG. 9;

FIG. 11 (A) is an enlarged cross sectional view showing a pair of pivotal cutting wheels and an essential portion of a drive mechanism of the cutting wheels incorporated in the mowing apparatus in FIG. 9;

FIG. 11 (B) is an enlarged cross sectional view of a part of the cutting wheels;

FIG. 15 is a cross-sectional view of a pair of pivotal cutting wheels and an essential portion of a drive mechanism of a fourth embodiment of the mowing apparatus according to the present invention;

FIG. 18(A) is a side view of a sixth embodiment of the mowing apparatus according to the present invention, which showes a bent hollow pipe connected between the bearing casing and the engine and so fixed to the bearing casing as to be suitable for use in mowing grass on the ground; and FIG. 18(B) is a similar side view showing the bent hollow pipe so fixed to the bearing casing as to be suitable for use in trimming garden trees.

DETAILED DESCRIPTION OF THE PREFERRED EMBODIMENTS

To facilitate understanding of the present invention, a brief reference will be made to a prior-art mowing machine including a mowing apparatus, with reference to the attached drawings.

In FIG. 1(A), a rotary cutting wheel CW having a number of cutting edges CE at the outer periphery thereof is rotatably supported by a bearing casing BC (cutter support body) and further driven by an engine EN via a transmission shaft rotatably passed through a hollow pipe HP connected between the bearing casing BC and the engine EN. A handle HA including a first grip $G_1$ is fixed at roughly the middle of the hollow pipe HP, and a second grip $G_2$ is directly fitted onto the hollow pipe HP so that the worker can swing the cutting wheels to and fro by griping the grips G1 and G2 by both hands.

In more detail with reference to FIG. 2, the transmission shaft TS drives by the engine EN is rotatably supported by two bearings :E provided on a junction point between the bearing casing BC and the hollow pipe HP. At the lowermost end of the transmission shaft TS, a first bevel gear $BG_1$ is fixed. On the other hand, a wheel shaft WS is also rotatably supported by two bearings BE fixed to the lower side of the bearing casing BC. At the uppermost end of the wheel shaft WS, a second bevel gear $BG_2$ is formed so as to be in mesh with the first bevel gear $BG_1$. The cutting wheel CW is pinched between two washers $WA_1$ and $WA_2$ and fixed to the wheel shaft WS with a spline SP and a nut N.

When the worker grips the two grips $G_1$ and $G_2$ and swings the hollow pipe HP to and fro, grass can be mowed by the cutting wheel CW driven by the engine EN at a relatively high speed.

In the prior-art mowing machine, however, since only the single cutting wheel CW rotates at a relatively high speed, there exist various shortcomings such that pebblestones may be kicked off and soft grass cannot be well mowed even when the cutting wheel CW is moved violently to and fro.

In view of the above description, reference is now made to a first embodiment of a mowing apparatus according to the present invention.

Figure 3:
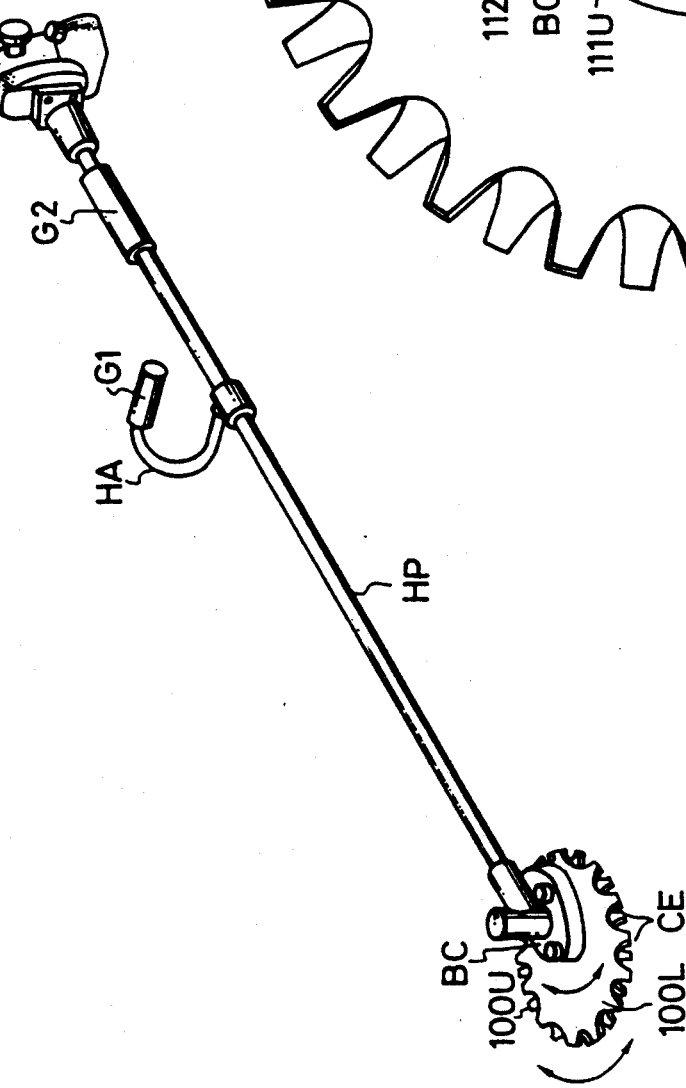
FIG. 3 is a perspective view showing a first embodiment of the mowing apparatus according to the present invention.

In FIG. 3, the feature of the mowing apparatus according to the present invention is to pivotally and reciprocationally drive a pair of upper and lower pivotal cutting wheels 100U and 100L, by an engine EN or an electric motor MO in two mutually opposite directions (clockwise and counterclockwise) in order to mow grass between two cutting edges formed along each outer periphery of the two pivotal cutting wheels 100U and 100L. That is to say, grass can be cut off in shearing mode, which being different from the prior-art cutter wheel which cuts off grass in chopping mode.

Figure 4:
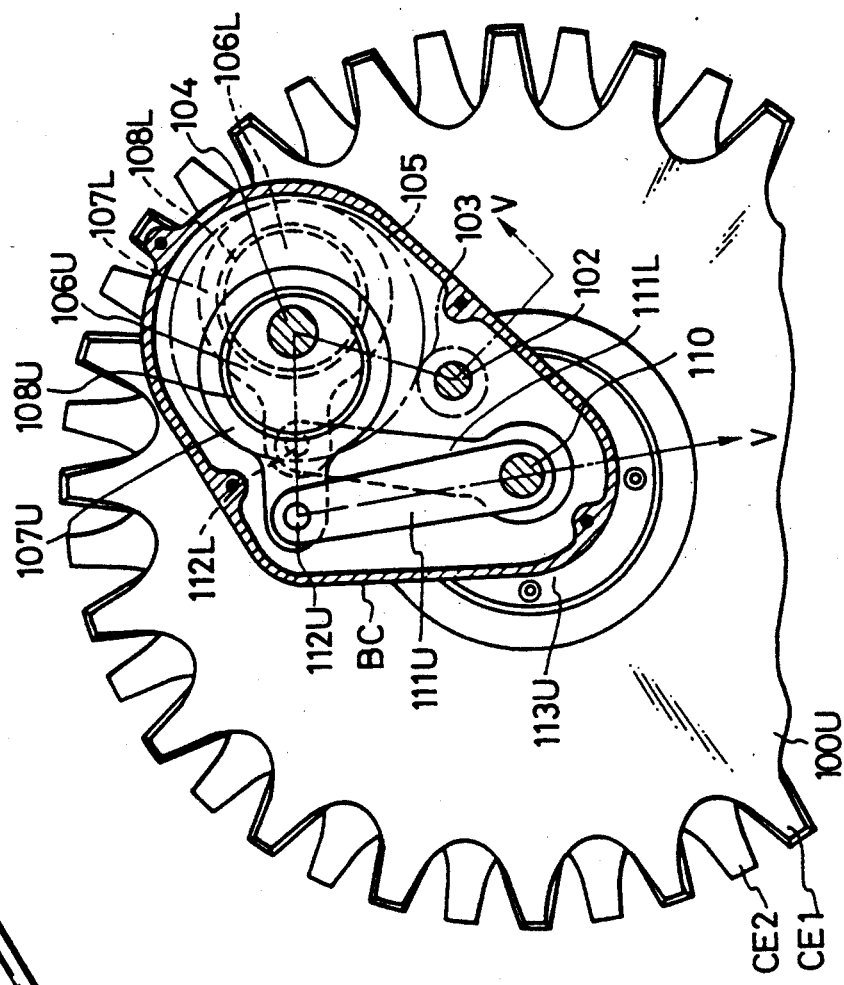
FIG. 4 is an enlarged plan view showing a pair of pivotal cutting wheels and an essential portion of a drive mechanism incorporated in the mowing apparatus shown in FIG. 3.
Figure 5:
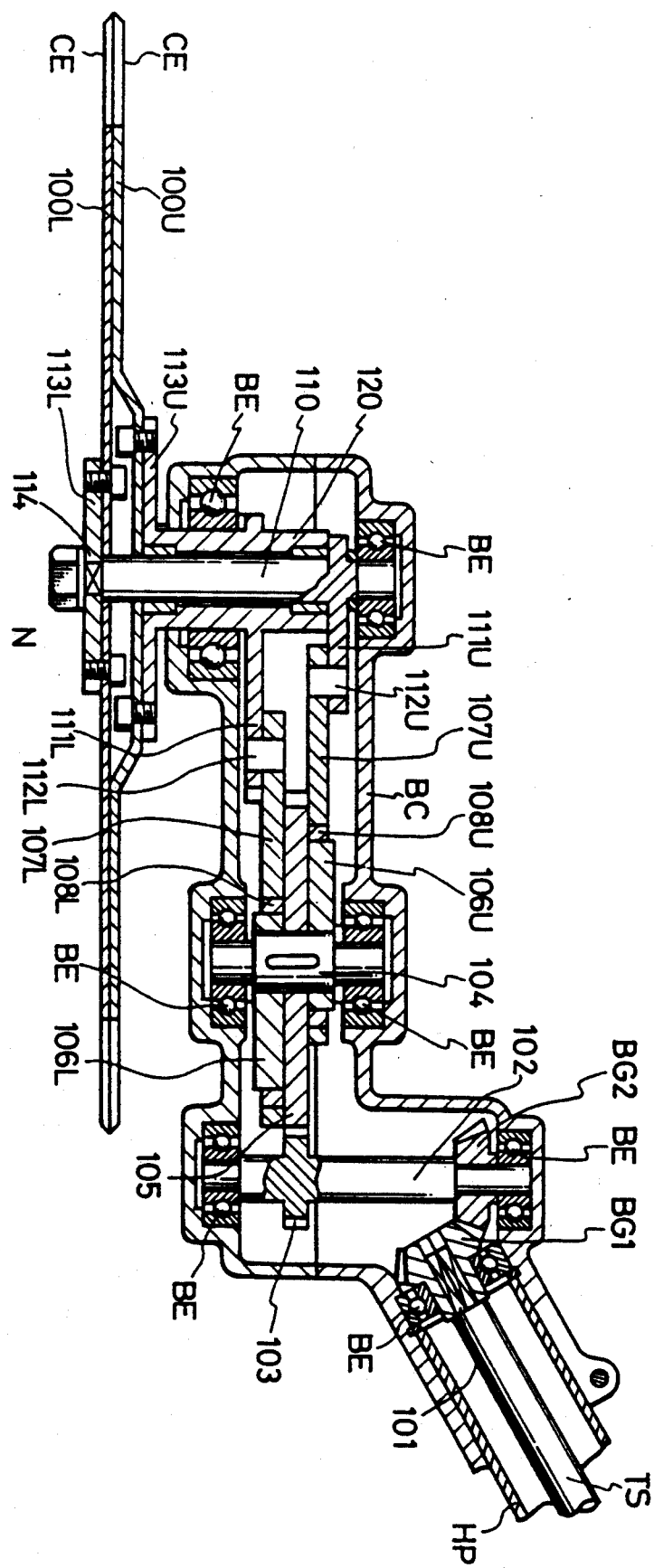
FIG. 5 is an enlarged cross-sectional view of the pivotal cutting wheels and the drive mechanism shown in FIG. 4.

In more detail in FIGS. 4 and 5, a transmission shaft TS is passed through a hollow pipe HP and rotatably supported by a bearing BE fixed to the lower end of the hollow pipe HP. A first bevel gear $BG_1$ is fixedly fitted to a square shaft portion 101 formed at the lower end of the transmission shaft TS as in the prior-art shown in FIG. 2.

An intermediate shaft 102 is rotatably supported vertically within the bearing casing BC by two upper and lower bearings BE. A second bevel gear $BG_2$ is fixed to the intermediate shaft 102 so as to be in mesh with the first bevel gear $BG_1$. In addition, a small spur gear 103 is formed in the intermediate shaft 102.

On the other hand, a crank shaft 104 is rotatably supported within the bearing casing BC by two upper and lower bearings BE. A large spur gear 105 is fixed to the cam shaft 104 at such a position as to engage with the small spur gear 103, which constitute a rotational speed reduction mechanism in this embodiment. Further, two (upper and lower) circular and eccentric cam plates 106U and 106L are fixed to the crank shaft 104 with keys. Here, it should be noted that these two circular cam plates 106U and 106L are eccentrically fixed on both the upper and lower surfaces of the large spur gear 105 in radially symmetrical positional relationship to each other with respect to the center of the crank shaft 104.

Further, each of two upper and lower annular connecting rods 107U and 107L is fitted to each of the cam plates 106U and 106L, respectively via each of two upper and lower annular bearings 108U and 108L.

A pivotal cutter wheel shaft 110 is also rotatably supported vertically within the bearing casing BC via a bearing BE. An upper arm 111U is fixed to at one end thereof the uppermost end of the pivotal cutter wheel shaft 110, and the other end of the upper arm 111U is pivotably connected to an end of the upper annular connecting rod 107U via a pin 112U. Further, a lower cutter wheel support plate 113L is fitted to a square portion 114 of the pivotal center wheel shaft 110 and fixed to the shaft 110 by a nut N. A lower cutting wheel 100L is fixed to the lower cutter wheel support plate 113L with bolts as shown in FIG. 5.

On the other hand, a cylindrical member 120 formed with a lower arm 111L and an upper cutter wheel support plate 113U are rotatably fitted around the pivotal center wheel shaft 110. An end of the lower arm 111L is also pivotably connected to an end of the lower connecting rod 107L via a pin 112L. Further, an upper cutting wheel 100U is fixed to the upper cutting wheel support plate 113U with bolts as shown in FIG. 5.

Namely, in this embodiment, the rotating means comprises the casing (BC), the crank shaft (104), the upper and lower cam plates (106U, 106L), the first and second connecting rods (107U, 107L), the upper and lower arms (111U, 111L) the pivotal cutter wheel shaft (110), and the cylindrical member (120).

In operation, when the engine EN is driven, power is transmitted to the crank shaft 104 by way of the transmission shaft TS, the first bevel gear $BG_1$, the second bevel gear $BG_2$, the internediate shaft 102, the small spur gear 103 and the large spur gear 105, so that the crank shaft 104 is rotated. Therefore, the two circular cam plates 106U and 106L fixed to the crank shaft 104 are rotated, so that the two connecting rods 107U and 107L are driven reciprocably to and fro in FIG. 4. In this case, since the connecting rods 107U and 107L are located in radially symmetrical positional relationship to each other with respect to the center of the crank shaft 104, the two arms 111U and 111L pivotally connected to the two connecting rods 107U and 107L, respectively, are also driven in two opposing directions, respectively. As a result, the two upper and lower pivotal cutter wheels 100U and 100L are driven so as to reciprocatingly rotate in mutually opposite directions through a predetermined angle, respectively, whereby shearing off grass caught between two cutter edges CE of the upper and lower pivotal cutting wheels 100U and 100L. Therefore, it is unnecessary for the worker to swing the apparatus to chop grass as in the conventional machine, because this apparatus according to the present invention mows grasses in shear mode as by scissors.

FIG. 6 shows a second embodiment of the mowing apparatus according to the present invention.

In the first embodiment shown in FIGS. 3, 4 and 5, it is necessary to provide an excessive drive power relief device somewhere in the machine in order to prevent the cutting edges CE from being damaged when a rigid material such as metal piece is caught between the cutting edges. For this purpose, a clutch (not shown) can be provided between the transmission shaft TS and the engine EN. Or else, some parts of the bevel gears, the spur gears, the cam plates, etc. can be slidably mounted on the related parts.

For the purpose, in the second embodiment shown in FIG. 6, the lower pivotal cutting wheel 100L is slidably supported relative to the upper pivotal cutting wheel 100U by use of a plurality of dish-shaped plate springs DS.

In more detail, a lower cutter wheel support plate 113L is fitted to a square shaft portion 114 and fixed thereto by a nut. Further, a cutter wheel push plate 130 is fixed to the cutter wheel support plate 113L by screws with the lower pivotal cutting wheel 100L loosely sandwiched therebetween so as to provide a gap G (shown in FIG. 7) being wide enough to allow the lower cutting wheel 100L to be rotatable.

Further, a plurality of recesses 131 are formed on the upper surface of the cutter wheel push plate 130. A few dish-shaped springs DS as shown in FIGS. 8(A) and (B) are inserted into each recesses 131 in superposed relationship to each other in order to provide appropriate frictional forces between the two upper and lower pivotal cutting wheels 100U and 100L (at the outer peripheries thereof) and between the lower cutter wheel support plate 113L and the lower cutting wheel 100L (at the inner periphery thereof), in dependence upon the elastic force of the springs DS.

Therefore, when an excessive torque or shock is applied to the lower pivotal cutting wheel 100L because of a presence of rigid substance between two cutting edges, the lower pivotal cutting wheel 100L is slidably moved against a frictional force produced by the dish-shaped springs DS relative to the cutter wheel support plate 113L or to the upper pivotal cutting wheel 100U, in order to prevent the cutting wheels and other power transmitting parts from being damaged.

Further, in the second embodiment shown in FIG. 6, since the upper and lower pivotal cutting wheels 100U and 100L are also formed into a dish shape, only the outer peripheries of the two pivotal cutting wheels 100U and 100L are brought into tight contact with each other in dependence upon the elastic force of the cutting wheels themselves, thus it being possible to prevent grass from being sandwiched between cutting edges CE of the two cutting wheels 100U and 100L. According to the structure of this embodiment, a frictional force caused between the cutting wheels may be reduced.

Further, the upper pivotal cutting wheel 100U is slidably mounted to the lower pivotal cutting wheel 100L relatively.

FIGS. 9 to 14 show a third embodiment of the mowing apparatus according to the present invention.

In this embodiment, in order to facilitate the operation of the apparatus by reducing the weight of the head portion thereof where the crank lever mechanism and the cutting wheels or the like are provided as much as possible, the rotational speed reduction mechanism of the first embodiment which comprises the small spur gear 103 and the large spur gear 105 as shown in FIGS. 3, 4 and 5 is displaced from the head portion of the apparatus to the portion near to the engine, which is near at hand of the operator.

Specifically, in this embodiment shown in FIGS. 9 to 14, a gear case GC is integrally provided to a clutch housing CH of an engine EN. Please note that hereinafter the same reference numerals as those in FIGS. 3 to 5 designate the same or similar components each other.

Figure 13:
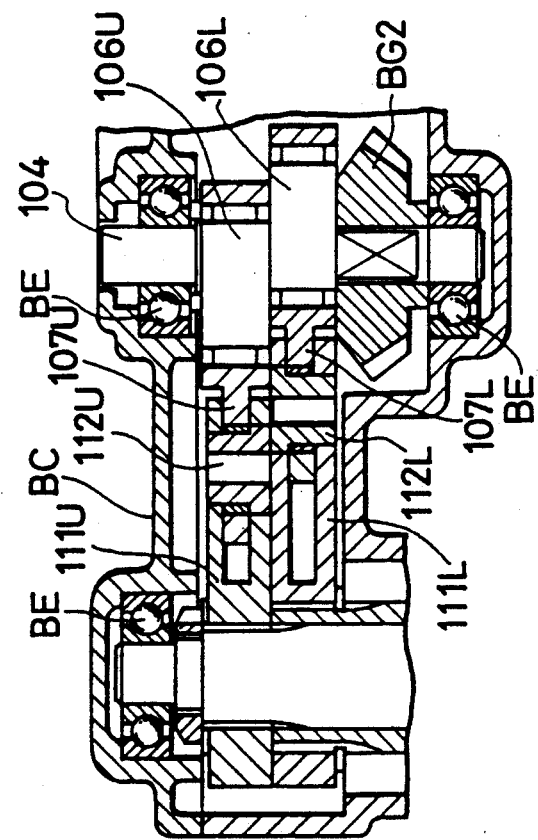
FIG. 13 is a cross-sectional view taken along line A—A in FIG. 12.
Figure 12:
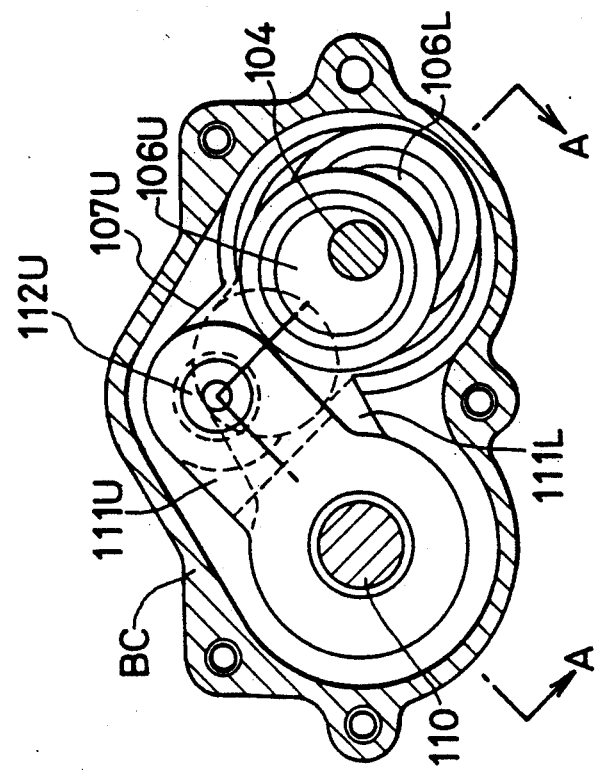
FIG. 12 is a cross-sectional view of the main part in FIG. 11.

In FIGS. 11 to 13, a lower cutter wheel suport plate 113L is integraly formed on a pivotal center wheel shaft 110, which is rotatably supported on a bearing case BC. On the lower surface of the lower cutter wheel suport plate 113L, there is provided a cover 122 for positioning the cutting wheels 100U and 100L to a predetermined hight from the surface of the ground. This cover 122 is fixed to the lower cutter wheel suport plate 113L with a screw 123 so as to protect a screw head of a screw 121 which fixes the lower cutting wheel 100L to the lower cutter wheel suport plate 113L. A second bevel gear $BG_2$ which is in mesh with a first bevel gear $BG_1$ coupled to an end of the transmission shaft TS is fixed to a crank shaft 104 which is rotatably supported in the bearing case BC through bearings BE. Eccentric cam plates 106U and 106L are fixed to the crank shaft 104 integrally. The pivotal center wheel shaft 110 is coupled with an upper arm 111U by means of a spline. A cylindrical member 120 into which the pivotal center wheel shaft is rotatably and coaxially inserted is coupled with a lower arm 111I by means of a spline. As shown in FIGS. 12 and 13, the cam plates 106U and 106L are connected to the upper and lower arms 111U and 111L through an upper and a lower connecting rods 107U, 107L and pins 112U, 112L, respectively. The upper and lower arms 111U, 111L are coupled to the pivotal cutter wheel shaft 110 and the cylindrical member 120, respectively, by means of splines.

An upper and a lower cutting wheels 100U and 100L are formed as a dish-shape, respectively. The circumferential portion of each cutting wheel 100U or 100L in which a plurality of cutting edges CE are provided is slightly bent toward the opposite cutting wheel. Therefore, when the upper and the lower cutting wheels 100U, 100L are mated together in such a manner that the cutting edges CE of each cutting wheel 100U, 100L are overlapped to each other, the cutting wheels 100U and 100L are contacted with each other only at the tip portions of the cutting edges CE of the cutting wheels 100U and 100L. This condition is shown in FIG. 11(A). On the other hand, when the cutting wheels 100U and 100L are mutually pivoted and the cutting edges CE of each cutting wheel 100U, 100L are arranged alternately, the tip portions of cuting edges CE of each cutting wheel 100U, 100L are slightly engaged with each other as shown in FIG. 11 (B), so that contacting points between the cutting edges CE of the upper and lower cutting wheel 100U, 100L are displable along the profile of each cutting edge CE according to the rotational motion of the cutting wheels. According to the structure of the cutting wheels described above, a mowing ability of the apparatus is remarkbly improved. Further, it becomes possible to prevent that grass to be cutted are caught between the cutting wheels.

Figure 14:
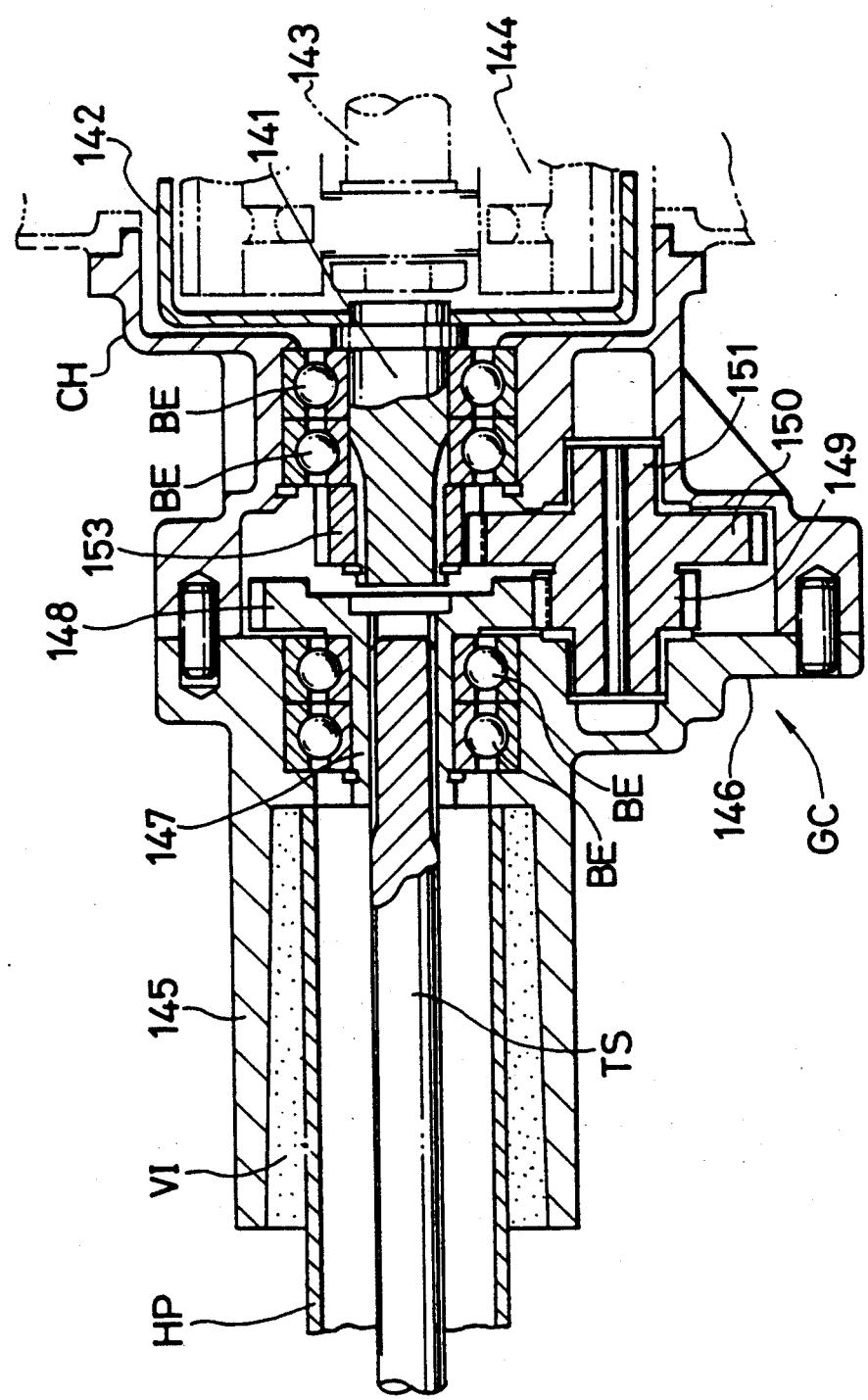
FIG. 14 is a cross-sectional view of a rotational speed reduction mechanism in FIG. 9.

FIG. 14 shows a rotational speed reduction mechanism of this apparatus. This speed reduction mechanism comprises a clutch housing CH mounted on the front portion of the engine EN. In the clutch housing CH, there is provided a drum shaft 141 rotatably and axially supported by a bearing BE. On the rear end of the drum shaft 141, a clutch drum 142 is mounted. The inner surface of the clutch drum 142 can be abutted by a centrifugal force on the outer circumference of a centrifugal clutch 144 which is provided on the front end of a crank shaft 143 of the engine EN. On the front side of the clutch housing CH, there is fixed a flange portion of a cylindrical connection case 145 to which a rear end portion of a hollow pipe HP is coupled through a rubber vibration insulator VI. In the connection case 145, a gear shaft 147 is rotatably and axially supported by means of a bearing BE. On the front end of the gear shaft 147, a transmission shaft TS which passes through the hollow pipe HP is fixed. On the rear end of the gear shaft 147, a large spur gear 148 is integrally fixed which engages with a small spur gear 149. The small spur gear 149 is integrally fixed onto a shaft 151 rotatably and axially supported in the gear case GC. Onto the shaft 151, a large spur gear 150 is also fixed. The large spur gear 150 is engaged with a small spur gear 153 fixed onto a front end portion of the drum shaft 141. Therefore, a rotational force from the engine EN is reducingly transmitted to the transmission shaft TS through the clutch drum 142, drum shaft 141, the small spur gear 153, the large spur gear 150, the shaft 151, the small spur gear 149 and the large spur gear 158 sequentially.

FIG. 15 shows a fourth embodiment of the present invetion. In this embodiment, a rotational force from a power source is directly transmitted to the crank shaft 104 without bevel gears. Excepting the structure, this embodiment has the same structure as that of the third embodiment. The mowing apparatus of this embodiment can be used in mowers having a bent hollow pipe through which a flexible cable is rotatably passed. Further, this device can also be used as an attachment of an industrial machine, in which a rotational force is supplied from the upper side of the apparatus to the crank shaft 104.

Figure 17:
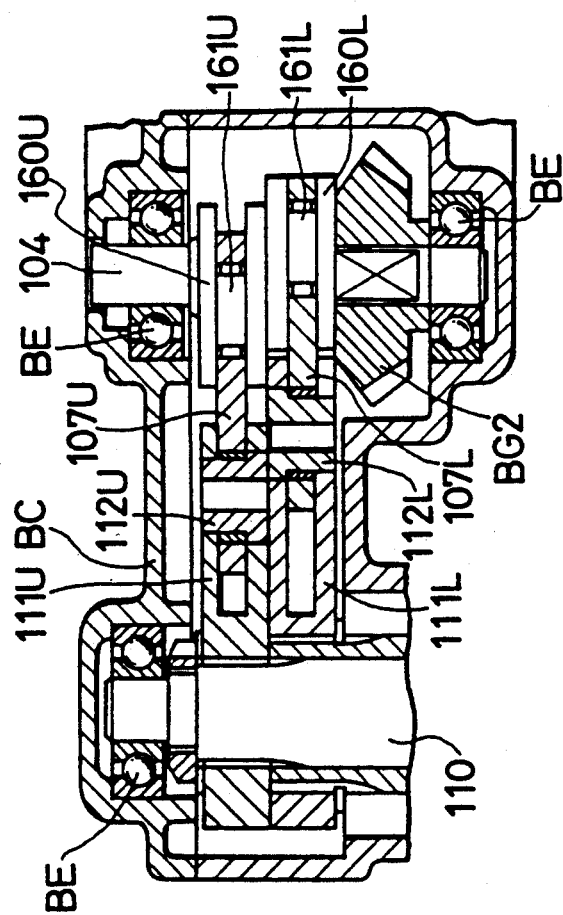
FIG. 17 is a cross-sectional view taken along line B—B in FIG. 16.
Figure 16:
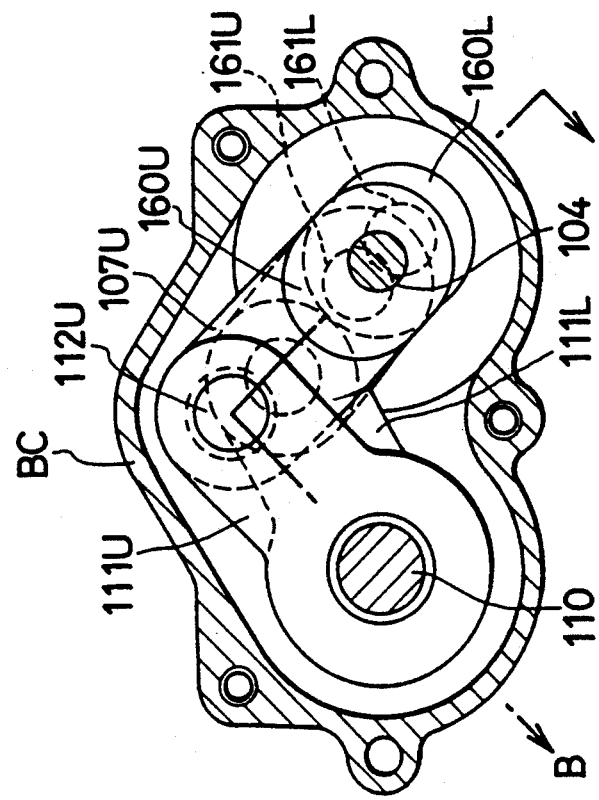
FIG. 16 is a cross-sectional view of the drive mechanism of a fifth embodiment.

FIGS. 16 and 17 show a fifth embodiment of the mowing apparatus of the present invention. In this embodiment, a crank lever mechanism comprising crank arms 160U and 160L are provided instead of the two circular eccentiric cam plates 106U and 106L as described hereinabove. Namely, on the crank shaft 104, the crank arms 160U and 160L are integrally formed. On the crank arm 160U and 160L, crank pins 161U and 161L are eccentrically mounted, respectively, to which connecting rods 107U and 107L are pivotably coupled. The connecting rods 107U, 107L are pivotally coupled with upper and lower arms 111U, 111L, respectively, through pins 112U, 112L. The upper and lower arms 111U, 111L are coupled to the pivotal cutter wheel shaft 110 and the cylindrical member 120, respectively, by means of splines. Therefore, in accordance with the rotation of the crank shaft 104, the upper and lower arms 111U and 111L are mutually pivoted toward the different directions, respectively, through the crank lever mechanism, whereby the cutting wheels 100U and 100L are reciprocatingly pivoted toward the different directions, respectively.

FIGS. 18(A) and (B) show a sixth embodiment of the mowing apparatus according to the present invention.

In the prior-art mowing apparatus, the hollow pipe HP connected between the engine EN and the bearing casing BC is formed straight. Therefore, this apparatus is convenient for mowing grass on the ground, but inconvenient in trimming the upper surface of garden trees or a hedge, for instance.

In order to overcome this problem, the hollow pipe HP is bent at an angle near the bearing casing BC as shown in FIG. 18(A). In this case, the transmission shaft TS is connected via a flexible drive shaft FS as shown by a circle in FIG. 18(A). Further, it is preferable to use an universal joint instead of &he flexible drive shaft FS.

In use, where the apparatus is used to mow grass on the ground, a screw 200 shown in FIG. 18(A) is loosened, and the hollow pipe HP is fixed relative to the cutting wheels at such a position as shown in FIG. 18(A). In contrast with this, where the apparatus is used to trim a garden tree, the screw 200 is loosened, and the hollow pipe HP is fixed as shown in FIG. 9(B).

Furthermore, in the above embodiments, the bearing casing BC is connected to the engine EN via the hollow pipe HP. Without being limited thereto, however, it is also possible to directly connect the engine to the bearing casing (without use of the pipe) to minimize the shape of the apparatus so that the apparatus is usable for trimming a low garden tree or lawn.

Further, it is of course possible to drive the cutting wheels by an electrical motor or a hydraulic motor in stead of an engine.

As described above, in the mowing apparatus according to the present invention, since the two cutting wheels are pivotally driven by an engine in two opposite rotational directions (clockwise and counterclockwise) at a relatively low speed to cut off grass in shear mode, the exist various advantages as follows:

(1) Since it is not necessary for the cutting wheels to be driven at a high speed, there exists no danger such that pebblestones or empty cans or the like are kicked off. Further, a reaction which may be caused when the cutting wheels strike an obstacle can be suppressed. Since inertial force in the rotational direction of the cutting wheels is so small to stop the rotation of the cutting wheels immediately when the operation is stopped. Further, cutted grass or the like are not scattered, clearance work such as collection of the cutted grass or sweep of the ground or the like becomes easy. Furthermore, it becomes possible to use the apparatus near a wall or around a waterside.

(2) Since grass is cut off between two cutter edges in shear mode, even soft grass can easily be sheared off without leaving grass unmowed.

(3) Since cutting edges are arranged in every direction of the circumference thereof, the worker can shear off grass in various directions by simply moving only the cutting wheels straight in any desired directions. An exchange of the cutting wheel can be easily made. Further, generally only one side of the cutting wheels is used for mowing, it is possible to obtain the same function as exchange of cutting wheels by changing the direction of the cutting wheels to the other side. Furthermore, since it is possible to thin the thickness of the cutting wheels, the weight of the apparatus can be reduced. Moreover, this apparatus can als be used as an edge trimmer.

(4) Since dish-shaped springs are provided so as to slidably rotate one of the two pivotal cutting wheels relative to the other in case an excessive force is applied to the wheels, it is possible to prevent the cutting edges from being damaged.

(5) Since the two pivotal cutting wheels are formed so as to reciprocatingly pivot toward the different directions, respectively, it is possible to prevent grass from being sandwiched between two cutting wheels.

(6) Since the hollow pipe is bent slightly via a flexible drive cable or a universal joint near the bearing casing, it is possible to use the mowing apparatus both in mowing grass on the ground and trimming a garden tree.

(7) Since the crank lever mechanism is accommodated in a case, a lublicant can be applied hereto, so that a durability can be improved. Further, it is also possible to prevent foreing substances such as sands, dusts or the like from entering thereinto, thus enabling the employment of the apparatus in the water or the ground.

What is claimed is:

1. A mowing apparatus driven by rotational motion supplied from a motive power source, comprising:
   a pair of first and second pivotal cutting wheels slidably superposed with each other, each of the wheels having a number of grass cutting edges and a central portion, the cutting wheels having two opposite sides facing away from each other; and
   means arranged on one of the two opposite sides of the cutting wheels for reciprocatingly rotating said cutting wheels in opposite directions through a predetermined angle, respectively, wherein said rotating means comprises:
   (a) a crank shaft rotatably driven by said motive power source,
   (b) a first shaft coupled to the central portion of said first wheel,
   (c) a second shaft coupled to the central portion of said second wheel and being of a hollow cylindrical configuration, said first shaft being rotatably and coaxially inserted into said second shaft, and
   (d) a crank lever mechanism provided between said crank shaft and said first and second shafts for converting the rotational motion of said crank shaft into two oppositely directed reciprocatingly rotational motions of said first and second shafts to reciprocatingly rotate the first and second cutting wheels relative to each other about a common axis of said shafts through the predetermined angle.

2. The mowing apparatus as set forth in claim 1, wherein said rotating means further comprises a casing in which said crank lever mechanism is accommodated.

3. The moving apparatus as set forth in claim 1, wherein said crank lever mechanism comprises:
   (a) first and second circular cam plates (106U, 106L) each fixed to said crank shaft in radially symmetrical positional relationship with respect to a center of said crank shaft;
   (b) first and second connecting rods (107U, 107L) each pivotably coupled to each of said first and second circular cam plates, respectively; and
   (c) first and second arms each pivotally coupled at one end thereof to an end of said first connecting rod (107U) and an end of said second connecting rod (107L), respectively, and said first and second arms being each coupled at the other end thereof to each of said first and second shafts, respectively.

4. The mowing apparatus as set forth in claim 1, wherein said crank lever mechanism comprises:
   (a) first and second crank arms (160U, 160L) each fixed to said crank shaft in radially symmetrical positional relationship with respect to a center of said crank shaft;
   (b) first and second connecting rods (107U, 107L) each pivotably coupled to each of said first and second crank arms, respectively; and
   (c) first and second arms each pivotally coupled at one end thereof to an end of said first connecting rod (107U) and an end of said second connecting rod (107L), respectively, and said first and second arms being each coupled at the other end thereof to each of said first and second shafts, respectively.

5. The mowing apparatus as set forth in claim 1, and further comprising elastic means (DS) for slidably supporting any one (100U) of said pivotal cutting wheels relative to the other (100L) of said pivotal cutting wheels.

6. The mowing apparatus as set forth in claim 5, wherein said elastic means includes at least one dish-shaped plate spring (DS) for elastically supporting said pivotal cutting wheel (100L) relative to said first shaft (110) or vice versa.

7. The mowing apparatus as set forth in claim 2, and further comprising:
   (a) a transmission shaft (TS) for transmitting a rotational force of said motive power source to said crank shaft, said transmission shaft having two ends and being connected at one end to said motive power source;
   (b) a first bevel gear ($BG_1$) fixed to the other end of said transmission shaft; and
   (c) a second bevel gear ($BG_2$) fixed to said crank shaft (104) so as to be in mesh with said first bevel gear.

8. The mowing apparatus as set forth in claim 7, wherein said mowing apparatus further comprises a rotational speed reduction mechanism for reducing the rotational speed of the motive power source to appropriate speed.

9. The mowing apparatus as set forth in claim 8, wherein said motive power source is connected to said casing (BC) through a hollow pipe (HP) into which said transmission shaft is rotatably inserted, and said rotational speed reduction mechanism is provided on said hollow pipe approximate to said motive power source.

10. The mowing apparatus as set forth in claim 8, wherein said rotational speed reduction mechanism is accommodated in said casing.

11. The mowing apparatus as set forth in claim 2, wherein said cutting edges of each of said pivotal cutting wheels are slightly bent toward the other cutting wheel in such a manner that only tip portions of said cutting edges of the cutting wheels are elastically contacted with each other when said cutting wheels are correctly superposed, whereby cutting ability of the cutting edges is improved.

12. The mowing apparatus as set forth in claim 7, wherein said transmission shaft (TS) comprises one of a flexible drive cable (FS) and an universal joint (UJ) near said casing to form a bent transmission shaft.

13. The mowing apparatus as set forth in claim 12, wherein said bent transmission shaft (TS) is adjustably rotatable and fixed to said casing to obtain cutting wheel angles relative to said transmission shaft (TS).

14. A mowing apparatus, comprising:
a motive power source for driving the apparatus;
a pair of first and second pivotal cutting wheels slidably superposed with each other and each having a number of grass cutting edges and a central portion, said cutting wheels having opposite sides facing away from each other; and
means arranged on one of the opposite sides of the cutting wheels for reciprocatingly rotating each cutting wheel in opposite directions through a predetermined angle, respectively, wherein said rotating means comprises:

(a) a crank shaft operatively connected to and rotatably driven by said motive power source,
(b) a first shaft coupled to the central portion of said first wheel,
(c) a second shaft coupled to the central portion of the second wheel and being of a hollow cylindrical configuration, said first shaft being rotatably and coaxially inserted into said second shaft, and
(d) a crank lever mechanism provided between said crank shaft and said first and second shafts for converting rotational motion of said crank shaft into two oppositely and reciprocatingly rotational motions of said first and second shafts to reciprocatingly rotate the first and second cutting wheels relative to each other about a common axis of said shafts through the predetermined angle.

15. The mowing apparatus as set forth in claim 1, wherein said motive power source is an engine.

16. The mowing apparatus as set forth in claim 1, wherein said motive power source is an electric motor.

17. The mowing apparatus as set forth in claim 1, wherein said motive power source is a hydraulic pressure motor.

18. The mowing apparatus as set forth in claim 14, wherein said motive power source is an engine.

19. The mowing apparatus as set forth in claim 14, wherein said motive power source is an electric motor.

20. The mowing apparatus as set forth in claim 14, wherein said motive power source is a hydraulic pressure motor.

* * * * *